(12) United States Patent
Krüger et al.

(10) Patent No.: US 12,219,197 B2
(45) Date of Patent: Feb. 4, 2025

(54) CLAIMING DELAYED LIVE REFERENCE STREAMS

(71) Applicant: Google LLC, Mountain View, CA (US)

(72) Inventors: Lars Fabian Krüger, Zurich (CH); Johan Georg Granström, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/674,083

(22) Filed: May 24, 2024

(65) Prior Publication Data

US 2024/0314382 A1    Sep. 19, 2024

Related U.S. Application Data

(63) Continuation of application No. 17/980,028, filed on Nov. 3, 2022, now Pat. No. 12,034,991, which is a continuation of application No. 15/351,283, filed on Nov. 14, 2016, now Pat. No. 11,494,467, which is a continuation of application No. 14/619,183, filed on (Continued)

(51) Int. Cl.
| | |
|---|---|
| *H04N 21/2743* | (2011.01) |
| *G06F 21/10* | (2013.01) |
| *G06Q 50/18* | (2012.01) |
| *H04N 21/2187* | (2011.01) |
| *H04N 21/254* | (2011.01) |
| *H04L 9/40* | (2022.01) |

(52) U.S. Cl.
CPC ....... *H04N 21/2743* (2013.01); *G06Q 50/184* (2013.01); *H04N 21/2187* (2013.01); *H04N 21/2541* (2013.01); *G06F 21/1078* (2023.08); *H04L 63/10* (2013.01); *H04L 2463/103* (2013.01)

(58) Field of Classification Search
CPC ............ G06F 21/10; G06F 2221/0775; G06Q 50/184; H04L 2463/103; H04L 63/10; H04N 21/2187; H04N 21/2541; H04N 21/2743
See application file for complete search history.

(56) References Cited

U.S. PATENT DOCUMENTS 6,823,492 B1    11/2004  Ambroziak
7,818,811 B2    10/2010  Kirovski et al.
(Continued)

OTHER PUBLICATIONS

Prosecution History from U.S. Appl. No. 15/351,283 dated Sep. 13, 2021 through Jul. 5, 2022, 53 pp.

(Continued)

*Primary Examiner* — Theodore C Parsons
(74) *Attorney, Agent, or Firm* — Shumaker & Sieffert, P.A.

(57) ABSTRACT

A system and method for identifying unauthorized uploaded content that has been uploaded before a validated live reference stream has been ingested is disclosed herein. The live reference stream is compared against the indexed uploaded content repeatedly as the live reference stream is received. The matching process is done once per a time period until a match meeting a minimum match duration threshold is identified. The match is then determined to be unauthorized, and a claim is issued against the unauthorized uploaded content. The time period can be based on a utility based analysis that factors the computational costs of repeated matching versus the diminishing value of the live reference stream as time progresses.

20 Claims, 10 Drawing Sheets

Related U.S. Application Data

Feb. 11, 2015, now Pat. No. 9,547,754, which is a continuation of application No. 13/435,990, filed on Mar. 30, 2012, now Pat. No. 8,990,951.

(56) References Cited

U.S. PATENT DOCUMENTS

| | | | |
|---|---|---|---|
| 8,655,826 B1 * | 2/2014 | Drewry | G06F 21/6218 |
| | | | 706/48 |
| 8,990,951 B1 | 3/2015 | Krüger et al. | |
| 9,547,754 B1 | 1/2017 | Krüger et al. | |
| 11,494,467 B1 | 11/2022 | Krüger et al. | |
| 2008/0178302 A1 | 7/2008 | Brock et al. | |
| 2008/0275763 A1 | 11/2008 | Tran et al. | |
| 2009/0052784 A1 | 2/2009 | Covell et al. | |
| 2009/0316890 A1 | 12/2009 | Schultz | |
| 2009/0327334 A1 * | 12/2009 | Rodriguez | H04N 21/4788 |
| | | | 707/999.102 |
| 2009/0328125 A1 | 12/2009 | Gits et al. | |
| 2009/0328236 A1 | 12/2009 | Schmelzer | |
| 2010/0262488 A1 * | 10/2010 | Harrison | H04N 7/17318 |
| | | | 705/14.46 |
| 2011/0184952 A1 | 7/2011 | Chen | |
| 2013/0042262 A1 | 2/2013 | Riethmueller | |
| 2013/0089304 A1 | 4/2013 | Jiang et al. | |
| 2013/0208942 A1 | 8/2013 | Davis | |
| 2023/0077432 A1 | 3/2023 | Krüger et al. | |

OTHER PUBLICATIONS

Prosecution History from U.S. Appl. No. 17/980,028 dated Mar. 24, 2023 through Mar. 12, 2024, 73 pp.

Prosecution History from U.S. Appl. No. 13/435,990. dated Jun. 18, 2013 through Nov. 17, 2014, 100 pp.

Prosecution History from U.S. Appl. No. 14/619,183. dated Sep. 15, 2015 through Sep. 14, 2016, 83 pp.

* cited by examiner

CLAIMING DELAYED LIVE REFERENCE STREAMS

CROSS-REFERENCE TO RELATED APPLICATIONS

This application is a continuation of U.S. patent application Ser. No. 17/980,028, filed Nov. 3, 2022, which is a continuation of U.S. patent application Ser. No. 15/351,283, filed Nov. 14, 2016, which is a continuation of U.S. patent application Ser. No. 14/619,183, filed Feb. 11, 2015, which is a continuation of U.S. patent application Ser. No. 13/435,990, filed Mar. 30, 2012, each of which is incorporated by reference in its entirety.

TECHNICAL FIELD

This disclosure relates generally to copyright protection for live streams, and specifically to copyright claims against content uploaded prior to ingestion of the live stream.

BACKGROUND

Current copyright protection schemes compare uploaded media content to an index of validated and protected content. If a match is made, a copyright claim is generated against the uploaded media content. Live video and audio streams can also be protected from matching content that is uploaded after the live video stream is received, as an index of validated content can be generated as the live media is received and processed. Any subsequently uploaded user video captured can be compared against the validated content to identify if the uploaded user video is unauthorized.

However, when a stream of media is created in real-time or near real time, processing in the transcoding pipeline can sometimes take a long time and interruptions between when the public broadcast occurs and when the reference is uploaded can cause delays such that the user uploaded content is uploaded before the live stream is indexed. If user uploaded content is uploaded first or at a time when the matching system is offline, it will not match against the live reference since the reference has not yet been indexed. When the live reference is activated in the match system, it will claim newly uploaded user content but will not claim the previously uploaded user content.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to identifying matches between user uploaded media content and validated content when the user uploaded media content is uploaded first. Disclosed herein is a system including an indexing component that indexes uploaded content based in part on an upload time. A matching component matches validated content against the uploaded content in response to the validated content being received after the upload time and the matching component also identifies unauthorized uploaded content. The matching component also matches the validated content against the uploaded content incrementally as the validated content is received.

The match component also determines a time period to incrementally match the validated content against the uploaded content based on a utility-based analysis that factors the computational costs of performing the matching against the benefit of early detection as the value of the validated content diminishes over time. A claim component is also disclosed that issues a claim of copyright infringement against the uploaded content in response to the matching component identifying unauthorized uploaded content and the unauthorized uploaded content meeting a minimum match duration.

Also disclosed herein is a method including indexing uploaded content based in part on an upload time. The method can include comparing validated content against the indexed uploaded content incrementally as it is received in response to receiving the validated content after the upload time. The method can further include identifying the uploaded content as unauthorized in response to finding a positive match between the validated content and the uploaded content. The method can also include issuing a flag indicating a potential infringement claim against the uploaded content in response to identifying unauthorized uploaded content.

Further disclosed herein is a non-transitory computer readable medium comprising computer executable instructions that in response to execution cause a computing system to perform operations that include indexing uploaded content based in part on an upload time, comparing validated content against the indexed uploaded content incrementally as it is received in response to receiving the validated content after the upload time. The operations can also include identifying the uploaded content as unauthorized in response to finding a positive match between the validated content and the uploaded content.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
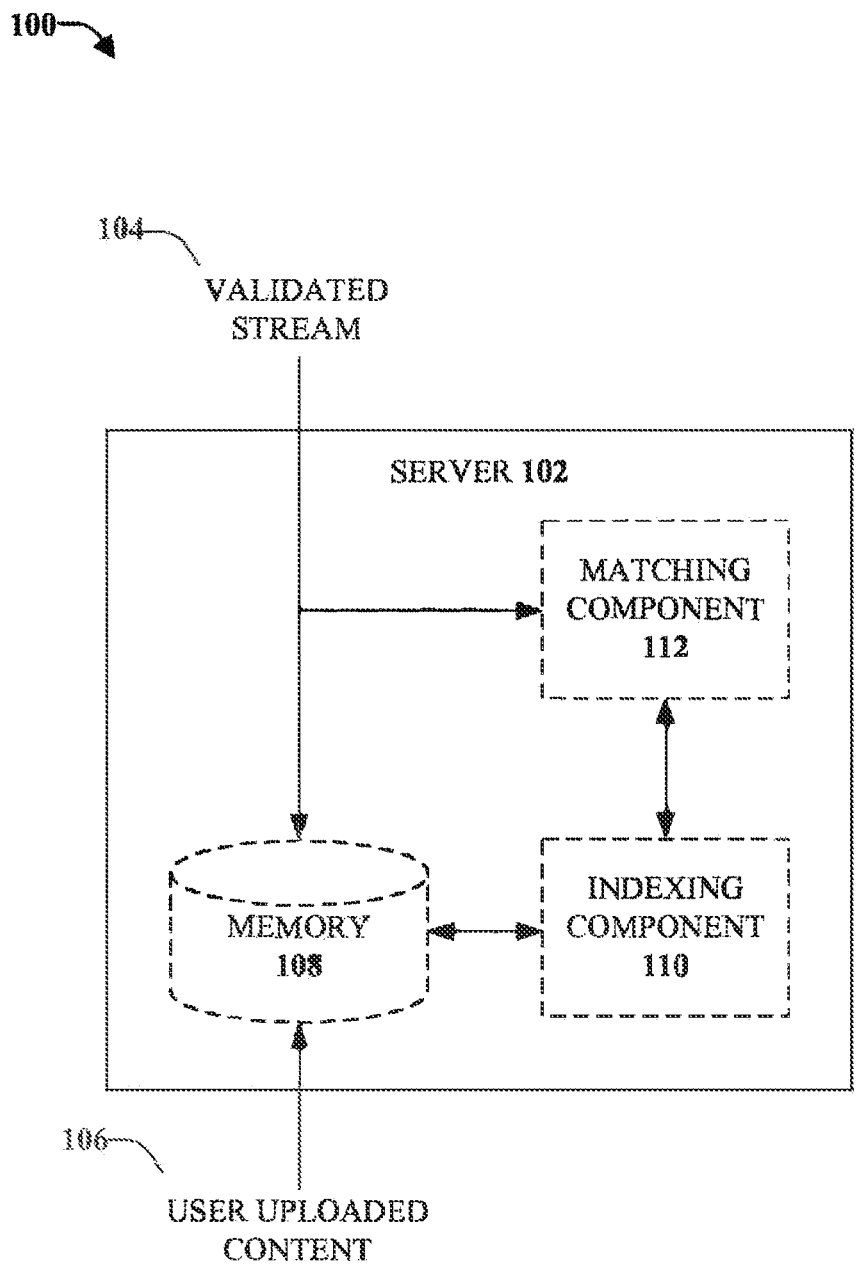
FIG. 1 is a block diagram illustrating an example, non-limiting embodiment of a system that can match validated content against user uploaded content in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, unauthorized user uploaded content can be identified even when the user uploaded content is uploaded prior to ingestion of a validated live stream. Moreover, one or more implementations described herein can provide for flagging potential copyright violations of the unauthorized uploaded content. The potentially infringing uploaded content can then be quarantined until its reviewed by the validated content owner.

Copyrighted content, such as a live stream of a broadcast TV can be uploaded over a network (e.g., the Internet) to a server for where it can be made available for streaming and/or viewing by an end user. The content can be validated, and an index of the validated content can be stored in memory, and user uploaded content can be compared against the index of validated content to determine whether the user uploaded content is unauthorized and/or potentially infringing the copyright of the validated content uploader.

Sometimes, ingestion of the live stream can be delayed, and the user uploaded content is uploaded before the live stream is finished processing. In these cases, a reverse content matching system can be used where the live stream is checked against an index of recently uploaded user uploads, kept in memory. Since the value of the live stream diminishes rapidly with time, it is important that a claim is generated against the user uploaded content very shortly after live reference ingestion. The live stream is therefore checked repeatedly against the user uploaded content, once per a time period, until a minimum match duration threshold has been met, at which point a claim is generated.

Referring now to the drawings, FIG. 1 illustrates a block diagram of an example system 100 that can match validated content against user uploaded content in accordance with various aspects and implementations described herein. The system 100 can be used to match a validated stream against user uploaded content to determine if the user uploaded content potentially infringes on the copyright of the validated stream and flags it for review.

The system 100 can include a server 102 that receives a validated stream 104 and user uploaded content 106. A memory 108 can store the user uploaded content 106, and the validated stream 104. An indexing component 110 can be provided to index the uploaded content based in part on the time of upload. The index of the user uploaded content can also be stored in memory 108. A matching component 112 can be provided to match the validated stream 104 against the indexed user uploaded content 106 if the user uploaded content 106 is received first. The matching component 112 can also match the user uploaded content 106 against an index of the validated stream 104 if the validated stream 104 is received prior to the user uploaded content 106.

In some implementations, the validated stream can be a stream from a live television or radio broadcast or from a newsfeed. The validated stream can also be streamed to the server 102 as it is recorded, or in other implementations it can be uploaded after the live event has completed.

In some aspects of the present disclosure, the matching component 112 can match the validated stream 104 against the indexed user uploaded stream 106 once the validated stream is complete. In other aspects of the present disclosure, the matching component 112 can match the validated stream 104 against the indexed user uploaded content 106 incrementally as the validated stream 104 is received. In some aspects of the present disclosure, the match component can perform the matching once per a time period.

In some aspects of the present disclosure, the time period can be defined by the validated content copyright holder. Alternatively, the time period can be determined based on a utility based analysis that factors a cost of matching content against a benefit of early detection of the unauthorized upload of the content. If the matching component 112 matches the validated stream 104 against the indexed user uploaded content 106 and detects a match, but the minimum match duration threshold has not been met yet, matching component 112 can rematch the validated stream 104 against the user uploaded content 106 every X seconds until the minimum match duration Y is hit. The total number of additional lookups of the validated stream 104 against the indexed user uploaded content can therefore be expressed as Z=Y/X. The copyright holder can set the Y, and the X can be selected such that the tradeoff between the additional latency L (while 0<L<X) and the load caused by the number of index lookups Z is fair. Accordingly, the utility based analysis is based on computational costs and the diminishing value of the validated content as time passes.

Figure 2:
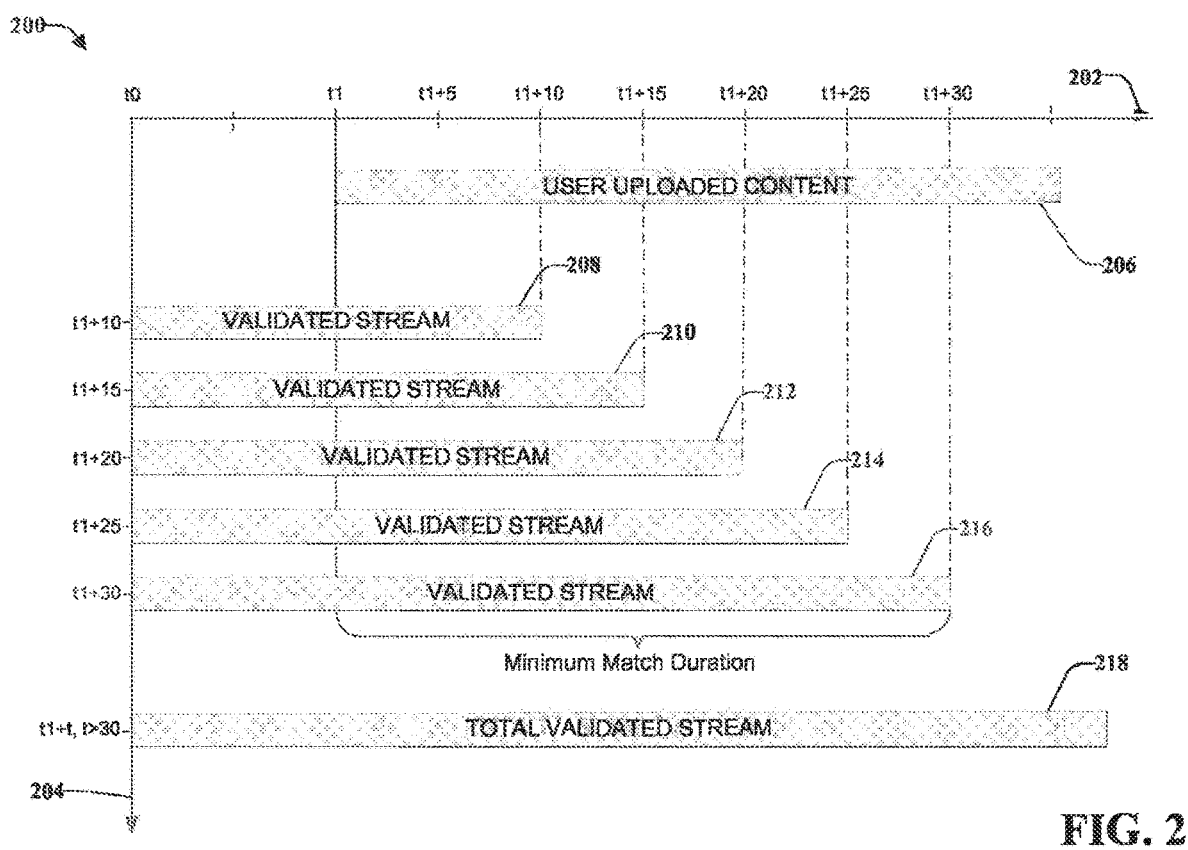
FIG. 2 is a block diagram illustrating an example, non-limiting embodiment of a system that can incrementally check for matching content in accordance with various aspects and implementations described herein.

Turning now to FIG. 2, a block diagram illustrating an example, non-limiting embodiment of a system that can incrementally check for matching content in accordance with various aspects and implementations is shown. Graph 200 depicts an example embodiment of how system 100 incrementally checks for matching content. Axis 202 shows the duration, in seconds, of the content, both the user uploaded content 206 and the validated stream. Axis 204 shows snapshots of content matches performed between the validated stream and the user uploaded content 206 at different times (208, 210, 212, 214, and 216). At 218, the validated stream has been fully ingested at time t1+t.

In some implementations, the user uploaded content 206 can be received by server 102, stored in memory 108 and/or indexed by indexing component 110. The user uploaded content 206 can be indexed based on an upload time which in FIG. 2 is shown to be t1. The user uploaded content 206, in this aspect of the present disclosure is at least 30 seconds long, as the bar extends past t1+30. It is to be appreciated that in other aspects of the disclosure, user uploaded content 206 can be shorter or longer than that depicted in FIG. 2.

In some aspects of the disclosure, the validated stream can be received very soon after user uploaded content 206. At 208, the validated stream is matched against the user uploaded content 206 at 10 seconds after the user uploaded content was indexed (at t1+10). Matching component 112 may determine that the validated stream matches the user uploaded content 206, but that a minimum match duration threshold has not been matched. Therefore, matching component 112 can incrementally match validated stream against the user uploaded content 206 every X seconds until a minimum match duration threshold is met.

In FIG. 2, X=5, and so matching component 112 performs the matching every 5 seconds, at t1+10, t1+15, t1+20, t1+25, and t1+30, shown at 208, 210, 212, 214, and 216 respectively. In other implementations, X can be another number, set by the copyright holder or determined by the utility based analysis. Matching component 112 continues to perform a matching every 5 seconds until the time is t1+30 at 216, at which time the minimum match duration threshold of Y=30 has been met. The minimum match duration threshold is the amount of matching content in the user uploaded content 206 that the copyright holder of the validated stream defines as unauthorized. In other words, if the user uploaded content 206 matches the validated stream, but is of a shorter duration than the minimum match threshold, the user uploaded content 206 will not trigger a copyright infringement claim.

In some implementations of the present disclosure, X and Y can have different values. For example, the minimum match duration could be set at 20 seconds, and matching component 112 can match the validated stream against the user uploaded content every 2 seconds until there is 20 seconds of matching content at which point a claim can be issued against the user uploaded content.

Figure 3:
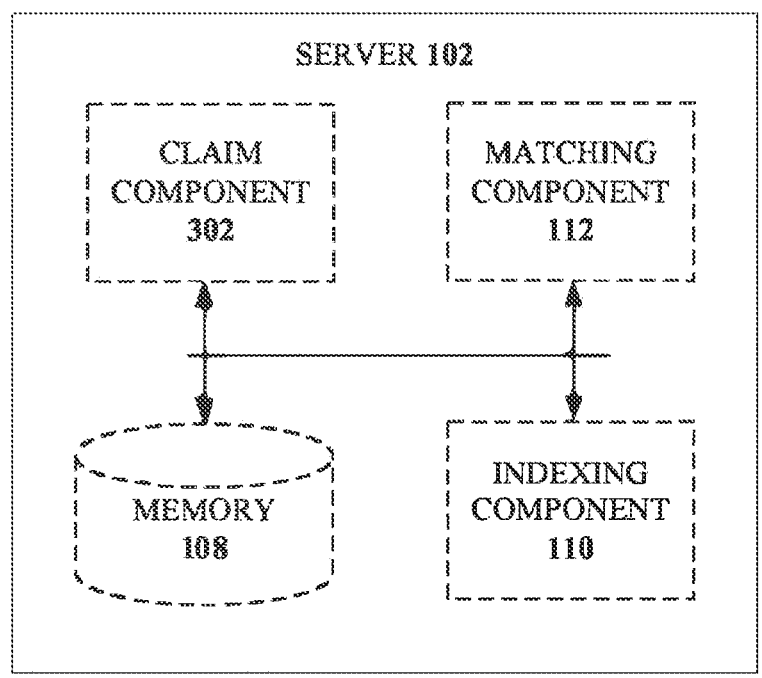
FIG. 3 is a block diagram illustrating an example, non-limiting embodiment of a system that can issue claims against unauthorized uploaded content in accordance with various aspects and implementations described herein.

FIG. 3 is a block diagram illustrating an example, non-limiting embodiment of a system 300 that can flag potential copyright violations of the unauthorized uploaded content in accordance with various aspects and implementations. System 300 can include server 102 that receives validated content and user uploaded content. The user uploaded content can be stored in memory 108. Indexing component 110 can index the user uploaded content based at least in part on the upload time, and matching component 112 can match the validated content against the uploaded content to determine if the validated content matches the user uploaded content. Claim component 302 can be provided to issue a flag indicating a potential copyright infringement claim against the user uploaded content if matching component 112 determines that the user uploaded content is unauthorized. The user uploaded content can then be quarantined until the validated content holder reviews the user uploaded content.

In some implementations of the present disclosure, the claim component 302 can monitor the matching performed by matching component 112. When a match between the validated stream and the user uploaded content reaches a minimum match duration threshold, claim component 302 will issue a flag indicating a potential copyright infringement claim against the user uploaded content.

In other implementations, the claim component 302 can issue a flag indicating a potential copyright infringement claim against the user uploaded content in response to the matching component 112 determining that the user uploaded content is unauthorized. Matching component 112 can determine that the user uploaded content is unauthorized based on whether a minimum match duration threshold is met. If the minimum match duration threshold is set to Y, and the user uploaded content matches for some duration less than Y, matching component 112 will determine that the user uploaded content is not unauthorized and the claim component 302 will not issue a flag indicating a potential copyright infringement claim against the user uploaded content.

Figure 4:
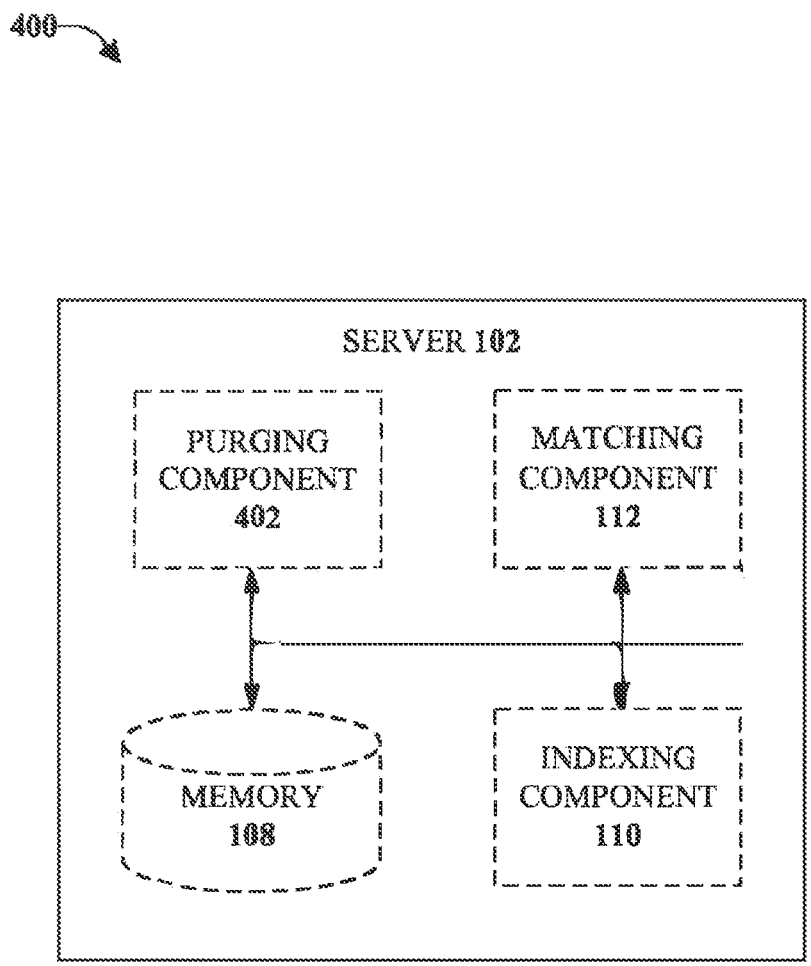
FIG. 4 is a block diagram illustrating an example, non-limiting embodiment of a system that can purge indexed user uploaded content after an expiration period in accordance with various aspects and implementations described herein.

Turning now to FIG. 4, a block diagram illustrating an example, non-limiting embodiment of a system 400 that can purge indexed user uploaded content after an expiration period in accordance with various aspects and implementations is shown. System 400 can include server 102 that receives validated content and user uploaded content. The user uploaded content can be stored in memory 108. Indexing component 110 can index the user uploaded content based at least in part on the upload time, and matching component 112 can match the validated content against the uploaded content to determine if the validated content matches the user uploaded content. Purging component 402 can also be included to delete the indexed user uploaded content from memory 108 after an expiration period.

In some aspects of the present disclosure, purging component 402 can delete the index created by indexing component 110. The user uploaded content can remain saved in memory 108, but the index has been purged. After purging, matching component 112 will cease matching validated streams against the user uploaded content, and flags indicating potential copyright violations will not be generated by claim component 302. In other embodiments of the present disclosure, purging component 402 can delete the user uploaded content from memory 108, both the index of the content, and the content itself The expiration period can be standardized for all user uploaded content. Different classes and/or types of user uploaded content can also have different expiration periods. For instance, the length of the user uploaded content can be a factor in determining the expiration period, e.g., longer user uploaded content can have a longer expiration period.

Figure 5:
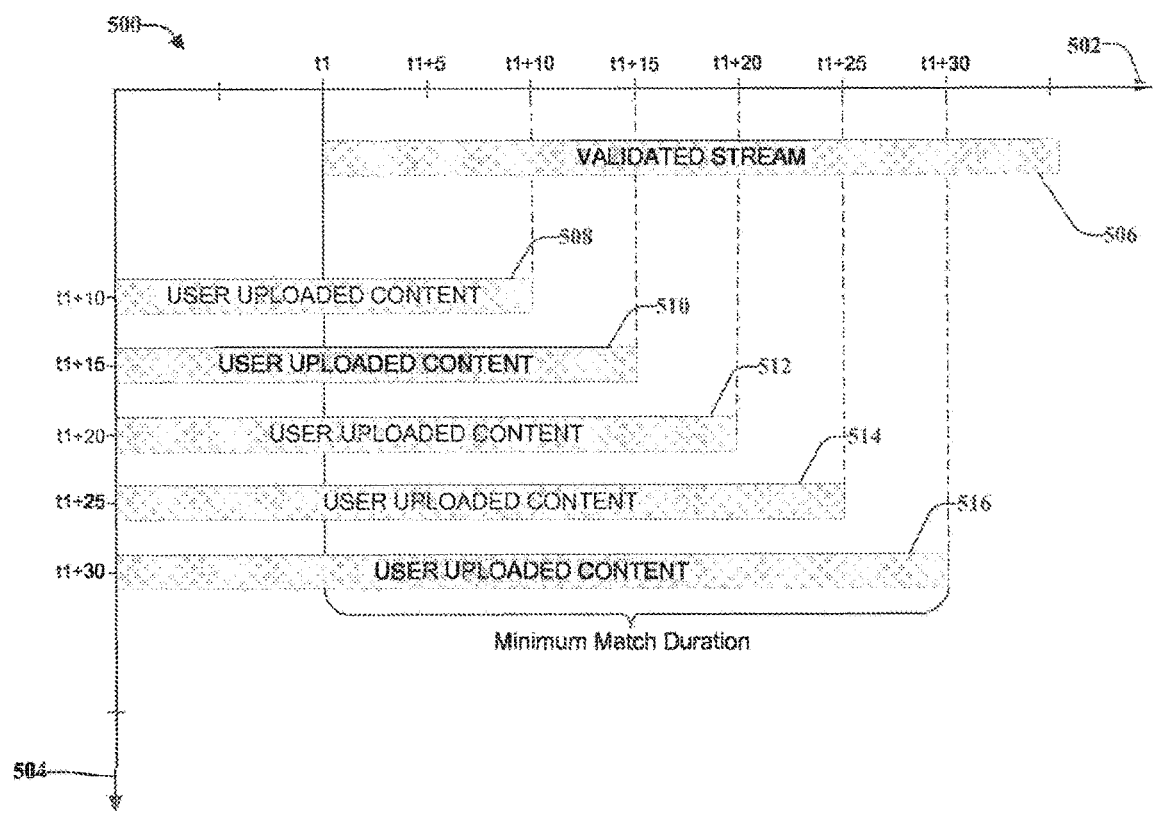
FIG. 5 is a block diagram illustrating an example, non-limiting embodiment of a system that can incrementally check for matching content in accordance with various aspects and implementations described herein.

Turning now to FIG. 5, a block diagram illustrating an example, non-limiting embodiment of a system that can incrementally check for matching content in accordance with various aspects and implementations of the disclosure is shown. Graph 500 depicts an example embodiment of how system 100 periodically checks for matching content. Axis 502 shows the duration, in seconds, of the content, both the user uploaded content and the validated stream 506. Axis 504 shows snapshots of content matches performed between the user uploaded content and the validated stream 506 at different times (508, 510, 512, 514, and 516).

In some implementations, the validated stream 506 can be ingested prior to the user uploaded content. When that happens, indexing component 110 can index the validated content, and user uploaded content received after validated stream 506 is ingested can be compared to the indexed validated stream 506 to determine whether or not the user uploaded content is unauthorized. At 508, the user uploaded content is matched against the validated stream 506 at 10 seconds after the validated stream 506 was indexed (at t1+10). Matching component 112 may determine that the user uploaded content matches the validated stream 506, but that a minimum match duration threshold has not been matched. Therefore, matching component 112 can incrementally match the user uploaded content against the validated stream 506 every X seconds until a minimum match duration threshold is met.

In FIG. 5, X=5, and so matching component 112 performs the matching every 5 seconds, at t1+10, t1+15, t1+20, t1+25, and t1+30, shown at 508, 510, 512, 514, and 516 respectively. Matching component 112 continues to perform a matching every 5 seconds until the time is t1+30 at 516, when the minimum match duration threshold of Y=30 has been met. The minimum match duration threshold is the amount of matching content in the user uploaded content that the copyright holder of the validated stream defines as unauthorized. In other words, if the user uploaded content matches the validated stream 506, but is of a shorter duration than the minimum match threshold, the user uploaded content will not trigger a potential copyright infringement claim.

Figure 6:
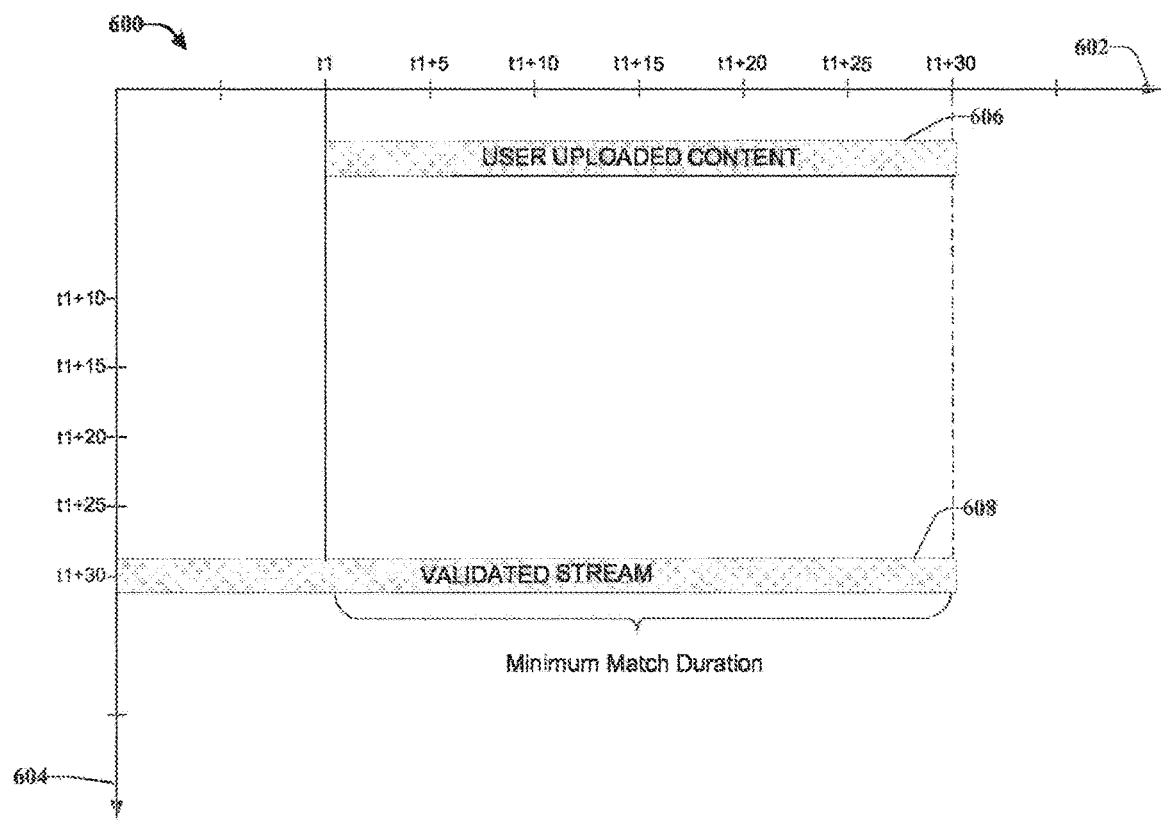
FIG. 6 is a block diagram illustrating an example, non-limiting embodiment of a system for matching content in accordance with various aspects and implementations described herein.

Turning now to FIG. 6, a block diagram illustrating an example, non-limiting embodiment of a system for matching content in accordance with various aspects and implementations is shown. Graph 600 depicts an example embodiment of how system 100 checks for matching content once the validated stream 608 is completely ingested. Axis 602 shows the duration, in seconds, of the content, both the user uploaded content 606 and the validated stream 608. Axis 604 shows the time (t1+30) that the validated stream 608 is completely ingested and processed.

In some embodiments, the system 100 can wait to perform the matching process until the validated stream 608 has completed, and the content has been fully ingested and processed. In this embodiment, matching component 112 can wait to perform the matching until server 102 is no longer streaming the validated stream 608, and the validated content is fully stored in memory 108.

Figure 7:
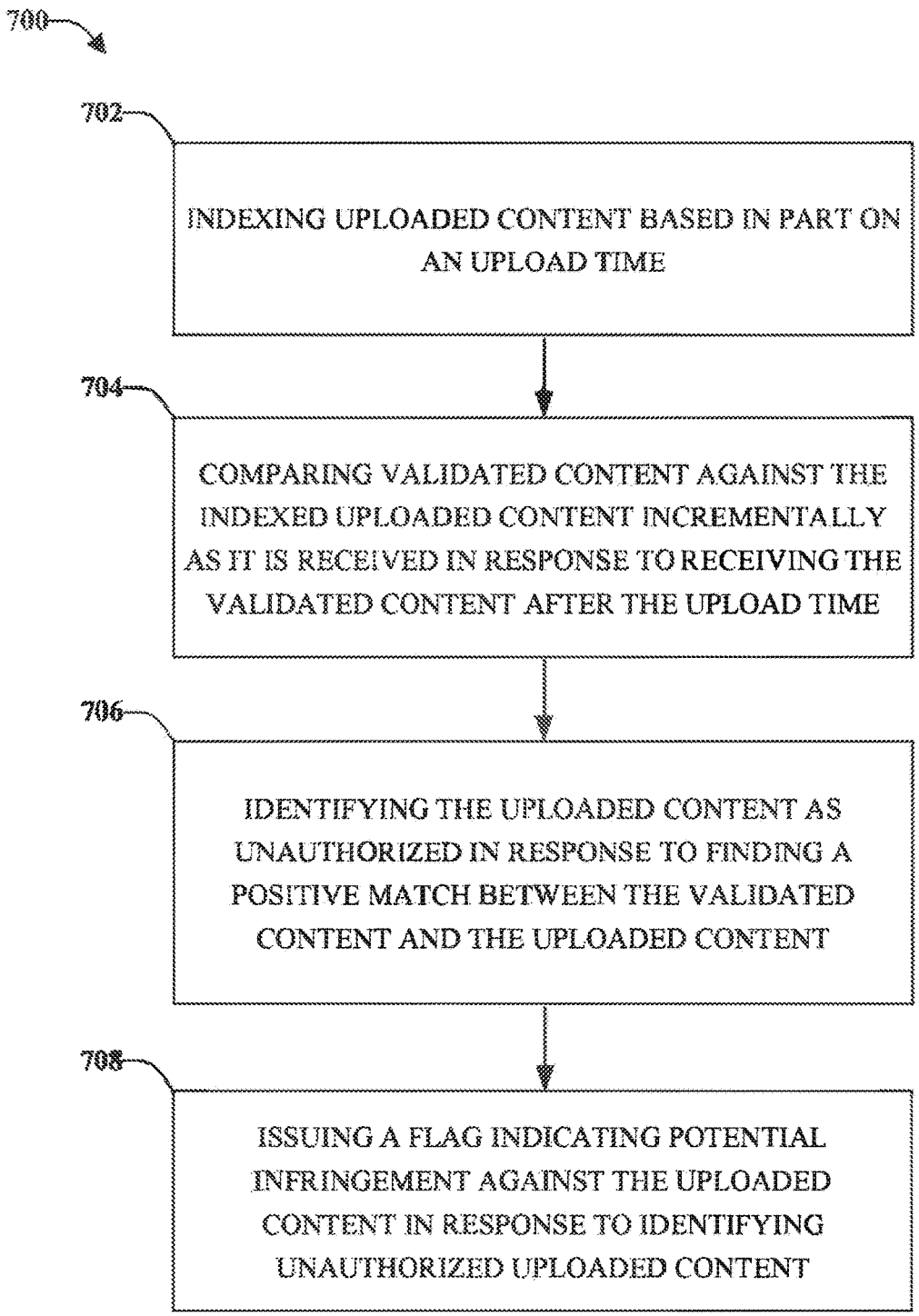
FIG. 7 illustrates a flow diagram of an example, non-limiting embodiment for identifying unauthorized uploaded content in accordance with various aspects and implementations described herein.

FIG. 7 illustrates an exemplary flow diagram 700 of an example non-limiting embodiment of a methodology for identifying unauthorized uploaded content according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in FIG. 1-6 can be and are intended to be implementable as methods and/or in accordance with the following depicted method.

At 702, uploaded content is indexed (e.g. by indexing component 110) based at least in part on an upload time. The index of the uploaded content can then be stored to memory. When validated content is received, the time of ingestion is compared to the indexed uploaded content to determine which one arrived first. If the validated content is received after the uploaded content, at 704, the validated content can be incrementally compared (e.g. by matching component 712) to the uploaded content as the validated content is received.

Comparing the validated content against the indexed uploaded content can be done once per a time period. In some embodiments, the time period can be defined by the validated content copyright holder. Alternatively the time period can be determined based on a utility based analysis that factors a cost of matching content against a benefit of early detection of the unauthorized upload of the content. If the comparing detects a match but the minimum match duration threshold has not been met yet the validated content can be matched against the uploaded content every X seconds until the minimum match duration Y is hit.

At step 706, if a positive match is found (i.e. the uploaded content matches the validated content, and the matching section is at least of a minimum duration threshold), the uploaded content is identified as unauthorized. The minimum match duration threshold is the amount of matching content in the uploaded content that the copyright holder of the validated stream defines as unauthorized. In other words, if the uploaded content matches the validated content, but is of a shorter duration than the minimum match threshold, the uploaded content will not be identified as unauthorized. In response to identifying unauthorized uploaded content, at 708, a potential copyright infringement claim is issued (e.g. by claim component 302) against the uploaded content.

Figure 8:
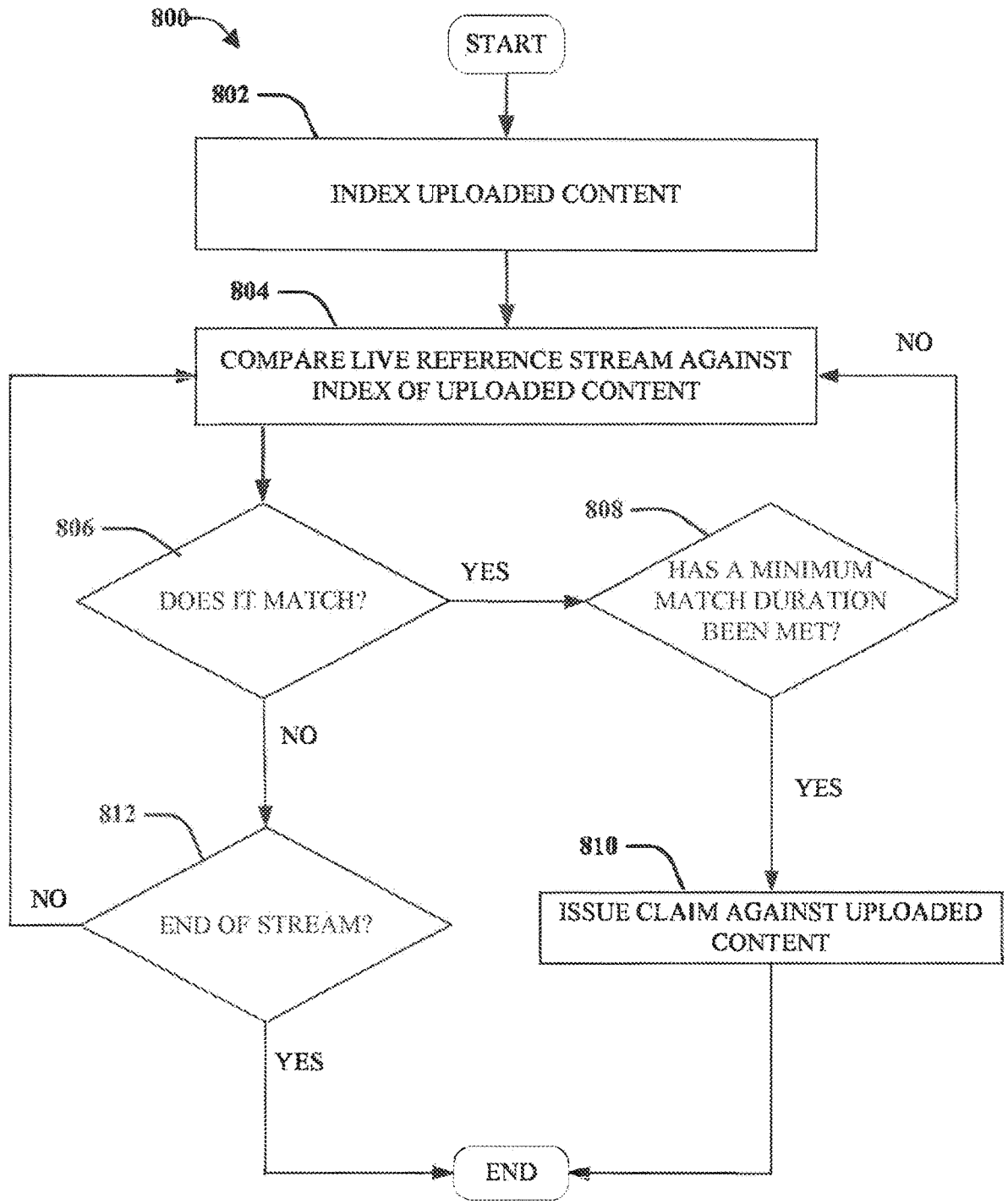
FIG. 8 illustrates a flow diagram of an example, non-limiting embodiment for issuing a claim against unauthorized uploaded content in accordance with various aspects and implementations described herein.

FIG. 8 illustrates an exemplary flow diagram 800 of an example, non-limiting embodiment for issuing a claim against unauthorized uploaded content in accordance with various aspects and implementations described herein. It is to be appreciated that the detailed description of such acts in FIGS. 1-6 can be and are intended to be implementable as methods and/or in accordance with the following depicted method.

At 802, uploaded content is indexed based at least in part on an upload time. A live reference stream of validated content that is received after the uploaded content is indexed is then compared to the indexed uploaded content at 804. A determination, at 806, is then made whether or not the validated live reference stream matches the uploaded content. If there is a match, the length of the matching portion is measured to determine if the minimum match duration threshold has been met at step 808. If the matching portion is not at the minimum match duration, the live reference stream is compared to the indexed uploaded content at a later time at 804. If the matching portion is at least as long as the minimum match duration, a threshold determined by the validated content copyright holder, a flag indicating a potential copyright infringement claim is issued against uploaded content at 810.

If there is no match at 806, a determination is made at 812 whether the live reference stream is at the end of the stream. If live reference stream is not at the end of the stream, the process goes back to 804 to continue comparing the live reference stream against the index of uploaded content. If the live reference stream is at the end of the stream, the process ends, and no further comparisons are made.

Exemplary Computing Device

Figure 9:
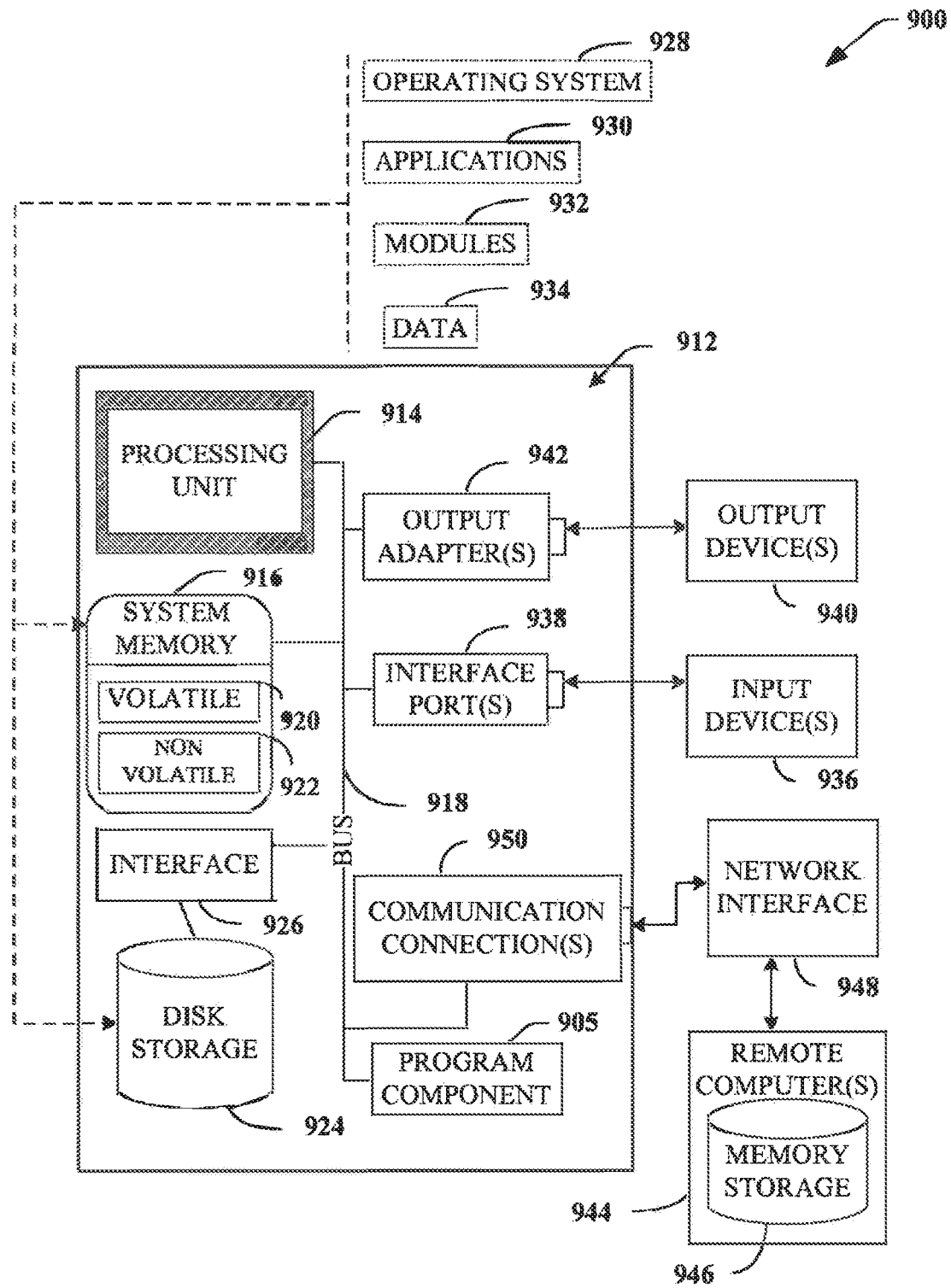
FIG. 9 is a block diagram illustrating an example computing device that is arranged in accordance with various aspects and implementations described herein.

With reference to FIG. 9, a suitable environment 900 for implementing various aspects of this disclosure includes a computing device 912. It is to be appreciated that the computer 912 can be used in connection with implementing one or more of the systems or component shown and described in connection with FIGS. 1-6. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/nonvolatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used to identify unauthorized uploaded content that is received before a live reference stream is ingested. Computing device 912 can also issue flag indicating potential copyright infringement claims against the user uploaded content in response to determining the user uploaded content is unauthorized. As more fully disclosed herein, in some implementations, the computing device 912 can include one or more processors (e.g., 914) that can be used to process data, including processing data to perform various tasks (e.g., indexing uploaded content, matching validated live reference streams against the indexed uploaded content, identifying unauthorized uploaded content, issuing claims against the uploaded content, performing utility based analyses, etc.).

The computing device 912 can include a program component 905 that can be associated with (e.g., communicatively connected to) the one or more processors. The program component 905 can contain, for example, a indexing component, a matching component, a purging component, and a claim component and/or other components, which can respectively function as more fully disclosed herein, to facilitate identifying matches between user uploaded media content and validated content and issuing flags indicating potential copyright claims against the user uploaded media content when the user uploaded media content is uploaded first.

Exemplary Networked and Distributed Environment

Figure 10:
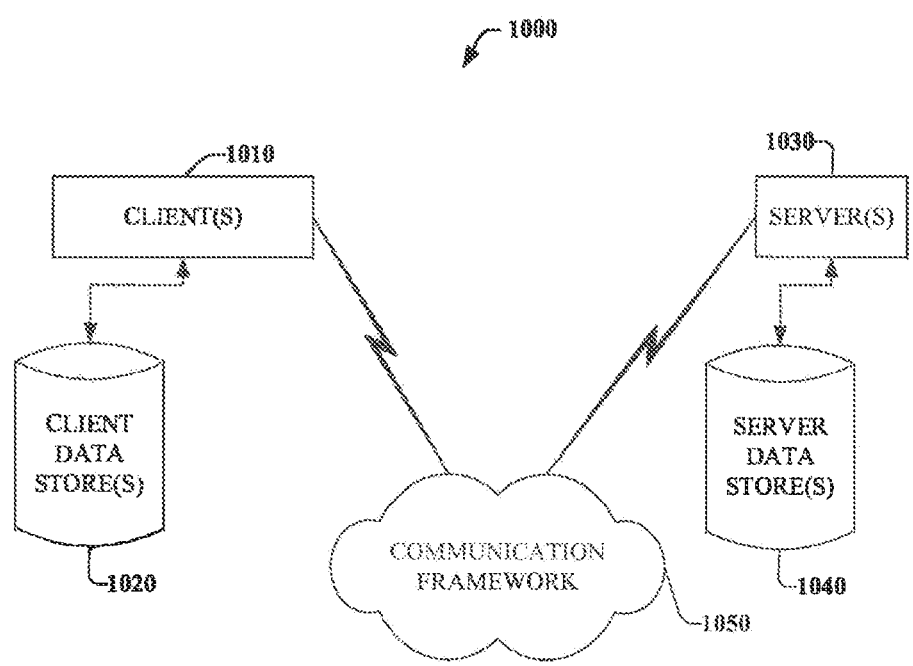
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as Internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising: a hardware processor that:
   receives a plurality of portions of a content stream;
   compares, as each portion of the content stream from the plurality of portions of the content stream is received, each of the portions of the content stream from the plurality of portions of the content stream to indexed content, each comparison being performed at a predetermined frequency, wherein the predetermined frequency is adjusted based on a previous comparison of a previous portion of the content stream to the indexed content;
   determines, based on the comparison of each of the plurality of portions of the content stream to the indexed content, whether a match amount that is greater than a match duration threshold value; and
   associates a flag with the content stream as containing unauthorized content.

2. The system of claim 1, wherein the match duration threshold value is set by a copyright holder of the indexed content.

3. The system of claim 1, wherein the match duration threshold value is a required amount of time that the unauthorized content in the content stream matches the indexed content to associate that the content stream with the flag as containing the unauthorized content.

4. The system of claim 1, wherein the hardware processor further generates a claim against the content stream for containing the unauthorized content.

5. The system of claim 1, wherein the predetermined frequency is a reoccurring time period that the content stream is continuously compared to the indexed content until the match duration threshold value is met, the predetermined frequency being less than the match duration threshold value.

6. The system of claim 1, wherein the predetermined frequency is further based on a value of matching unauthorized content, wherein the value is greater for early detection and diminishes as time passes.

7. The system of claim 1, wherein the predetermined frequency is further based on a latency of matching resulting from a number of lookups of the indexed content.

8. A method comprising:
receiving, using a hardware processor, a plurality of portions of a content stream;
comparing, using the hardware processor, as each portion from the plurality of portions of the content stream is received, each of the portions of the content stream from the plurality of portions of the content stream to indexed content, each comparison being performed at a predetermined frequency, wherein the predetermined frequency is adjusted based on a previous comparison of a previous portion of the content stream to the indexed content;
determining, using the hardware processor, based on the comparison of each of the plurality of portions of the content stream to the indexed content, whether a match amount that is greater than a match duration threshold value;
and associating, using the hardware processor, a flag with the content stream as containing unauthorized content.

9. The method of claim 8, wherein the match duration threshold value is set by a copyright holder of the indexed content.

10. The method of claim 8, wherein the match duration threshold value is a required amount of time that the unauthorized content in the content stream matches the indexed content to associate that the content stream with the flag as containing the unauthorized content.

11. The method of claim 8, further comprising generating, by the hardware processor, a claim against the content stream for containing the unauthorized content.

12. The method of claim 8, wherein the predetermined frequency is a reoccurring time period that the content stream is continuously compared to the indexed content until the match duration threshold value is met, the predetermined frequency being less than the match duration threshold value.

13. The method of claim 8, wherein the predetermined frequency is further based on a value of matching unauthorized content, wherein the value is greater for early detection and diminishes as time passes.

14. The method of claim 8, wherein the predetermined frequency is further based on a latency of matching resulting from a number of lookups of the indexed content.

15. A non-transitory computer-readable medium containing computer-executable instructions that, when executed by a processor, cause the processor to:
receive a plurality of portions of a content stream;
compare, as each portion from the plurality of portions of the content stream is received, each of the portions of the content stream from the plurality of portions of the content stream to indexed content, each comparison being performed at a predetermined frequency, wherein the predetermined frequency is adjusted based on a previous comparison of a previous portion of the content stream to the indexed content;
determine, based on the comparison of each of the plurality of portions of the content stream to the indexed content, whether a match amount that is greater than a match duration threshold value;
and associate a flag with the content stream as containing unauthorized content.

16. The non-transitory computer-readable medium of claim 15, wherein the match duration threshold value is set by a copyright holder of the indexed content.

17. The non-transitory computer-readable medium of claim 15, wherein the match duration threshold value is a required amount of time that the unauthorized content in the content stream matches the indexed content to associate that the content stream with the flag as containing the unauthorized content.

18. The non-transitory computer-readable medium of claim 15, wherein execution of the instructions further cause the processor to generate a claim against the content stream for containing the unauthorized content.

19. The non-transitory computer-readable medium of claim 15, wherein the predetermined frequency is a reoccurring time period that the content stream is continuously compared to the indexed content until the match duration threshold value is met, the predetermined frequency being less than the match duration threshold value.

20. The non-transitory computer-readable medium of claim 15, wherein the predetermined frequency is further based on a value of matching unauthorized content, wherein the value is greater for early detection and diminishes as time passes.

* * * * *